(12) United States Patent
Bernitsas (10) Patent No.: US 6,763,305 B2
(45) Date of Patent: Jul. 13, 2004

(54) SUBSURFACE ILLUMINATION, A HYBRID WAVE EQUATION-RAY-TRACING METHOD

(75) Inventor: Nikolaos Bernitsas, Sugar Land, TX (US)

(73) Assignee: GX Technology Corporation, Houston, TX (US)

( * ) Notice: Subject to any disclaimer, the term of this patent is extended or adjusted under 35 U.S.C. 154(b) by 130 days.

(21) Appl. No.: 10/243,175

(22) Filed: Sep. 13, 2002

(65) Prior Publication Data

US 2004/0054477 A1 Mar. 18, 2004

(51) Int. Cl.$^7$ .............................. G06F 19/00; G01V 1/00
(52) U.S. Cl. ........................................... 702/14; 367/38
(58) Field of Search .............................. 702/14, 18, 16; 367/38; 703/2

(56) References Cited

U.S. PATENT DOCUMENTS

| | | | |
|---|---|---|---|
| 4,752,916 A | | 6/1988 | Loewenthal |
| 4,953,140 A | * | 8/1990 | Dablain ........................ 367/73 |
| 4,979,150 A | | 12/1990 | Barr |
| 5,229,938 A | * | 7/1993 | Wang et al. .................... 702/16 |
| 5,307,268 A | * | 4/1994 | Wang et al. .................... 702/16 |
| 5,532,976 A | * | 7/1996 | Schneider, Jr. ................ 367/38 |
| 5,557,583 A | | 9/1996 | Ha et al. |
| 5,693,885 A | | 12/1997 | Neidell |
| 6,112,155 A | * | 8/2000 | Pham ........................... 702/14 |
| 6,343,256 B1 | * | 1/2002 | Winbow et al. ............... 702/18 |
| 6,691,075 B1 | * | 2/2004 | Winbow et al. ................ 703/2 |

OTHER PUBLICATIONS

Bear et al., The Construction of Subsurface Illumination and Amplitude Maps Via Ray Tracing, Jul. 2000, The Leading Edge, pp. 726–728.*

Ratcliff et al., Geophysical Imaging of Subsalt Geology, Feb. 1997, The Leading Edge.*

Muerdter et al., Understanding Subsalt Illumination Through Ray–Tracing Modeling, Part 3: Salt Ridges and Furrows, and the Impact of Acquisition Orientation, Aug. 2001, The Leading Edge, pp. 803–816.*

Muerdter et al., Case Studies of 3–D Raytracing Modeling for Subsalt Exploration and Development in Offshore Louisiana, Gulf of Mexico, 1998 SEG Expanded Abstracts.*

Zhou, Zheng–Zheng, "Practical, Accurate, full–Azimuth 3–D Prestack Finite Difference Depth Migration," 2001 SEG/San Antonio 2001 Expanded Abstracts.

Laurain, Renaud, "PreStack DepthMigration and Illumination Maps," SEG/San Antonio 2001 Expanded Abstracts.

Bear et al., The Construction of Subsurface Illumination and Amplitude Maps Via Ray Tracing, The Leading Edge Jul. 2000, pp. 726–728.

* cited by examiner

*Primary Examiner*—John Barlow
*Assistant Examiner*—Toan M. Le
(74) *Attorney, Agent, or Firm*—Wong, Cabello, Lutsch, Rutherford & Brucculeri L.L.P.

(57) ABSTRACT

A method for improving illumination analysis in seismic data having steps of: selecting a model of the medium, a source and a receiver, a reflecting surface, finding a reflection point and the associated Fresnel zone according to Fermat principle using ray tracing, calculating the illumination in the Fresnel zone using the wave equation, repeating the illumination calculation for all frequencies all points on the reflecting surface and all source and the receiver pairs. The resulting illumination image may be used to assess the quality of or improve the seismic image of the same medium.

11 Claims, 5 Drawing Sheets

SUBSURFACE ILLUMINATION, A HYBRID WAVE EQUATION-RAY-TRACING METHOD

BACKGROUND OF THE INVENTION

1. Field of the Invention

This invention relates to seismic surveying, image processing, and more particularly, to illumination analysis of subsurface seismic horizons.

2. Description of the Related Art

Generally, marine seismic surveys are conducted by towing an energy source (emitter) and seismic receivers (detectors) behind a vessel. The source emits an acoustic wave in the water that travels downward to the underlying elastic earth. The sound wave is reflected by the various earth formations, and travels upward to the receivers. The seismic receivers (detectors) convert the acoustic signals, such as pressures, to electrical signals and those signals are thereafter recorded in various formats. Computers are used to analyze these data on board the vessel in real time and/or at on-shore office locations. The subsurface earth formations are reconstructed from this analysis, usually through images with color applied in the course of the analysis in order to differentiate the earth formations and strata. These techniques are used by geophysicists and geologists to locate particular earth formations in order to better predict sites for successful exploration wells and/or to better develop existing fields and wells.

A significant amount of exploratory work has been done in the seismic field, both onshore and offshore. The significance of finding accurate predictive tools has been growing as the exploration and production costs have continued to grow. The costs of production are prohibitive as operators drill in deeper waters and more hostile environments. Similarly, offshore seismic work has also become more expensive and difficult as this work is performed in deeper waters and more hostile environments. Currently the state of the art is represented by the following:

Assuming a spike source i.e. a source with a flat power spectrum, then the recorded data D for a wave that is emitted from the source S, propagated through the water and down into the earth, reflected at reflector r, propagated back to the surface, and recorded at the receiver G is represented by equation (1)

$$D(S\text{->}G) = W^+(S\text{->}r)^{}R(r)^{}W^-(r\text{->}G) \quad \text{Eq. (1)}$$

(** denotes convolution operation. $W^+$ is a forward propagating wave function that moves the seismic energy from the source to the specular reflection point r of the reflecting surface. R(r) is the reflectivity at location r. $W^-$ is a backward propagating wave function.)

$$F(r) = W^+(S\text{->}r)^{**}W(r\text{->}G) \quad \text{Eq. (2)}$$

F(r) represents the combined propagation effects for the downward and the upward waves that reach the subsurface point r and is commonly referred to as the overburden effect between the source and receivers.

Function D(S->G) is the data received by receivers. $W^+(S\text{->}r)$ and $W^-(r\text{->}G)$ are wave functions that depend on the underlying earth model. This earth model consists of a topological description of the subsurface geological formations, i.e. their relative locations, shapes and orientations, and the sound speed within these formations. R(r) is a function related to the contrast in intrinsic properties of the subsurface formations on either side of the reflecting surface. Function F(r) depends on the geometrical relationship between the source, the subsurface volume and receivers as well as the sound speed distribution in the subsurface volume. From the data function D and the overburden function F, one can determine function R which is the goal of seismic surveys.

To solve the wave equation by computing the functions $W^+(S\text{->}r)$ and $W^-(r\text{->}G)$ to derive function R(r) requires very intensive and costly computations. A highly simplified approach for computing a rough approximation of $W^+(S\text{->}r)$ and $W^-(r\text{->}G)$ is to use ray-tracing. The resulting function R(r), a function of a 3-D volume is commonly presented as a set of vertical or/and horizontal images, thus a 3-D object can be presented and analyzed more conveniently in two dimensions.

While deriving R(r) is the goal of any seismic experiment, the function F(r) is also of significant importance and use. When F(r) is computed by adding the contributions from all source and receiver pairs in a seismic survey then it represents the extent to which the subsurface has been illuminated given the particular seismic geometry that is being surveyed. The illumination information contained in F(r) helps to explain why a portion of the subsurface seismic image R(r) may be weak, noisy, unclear, etc. The most commonly used approach for estimating subsurface illumination involves the use of two-point ray tracing. Typically, a bundle of rays are shot from each surface shot location, propagated through a predefined earth model, impinge upon the horizon (a subsurface) which is the subject of illumination analysis, and reflect back to the surface where they are accepted or rejected based on the proximity of their emergence point to predefined receiver locations. The illumination maps generated by this method are either a direct or a weighted sum of the reflection points ("hits") per unit surface element of the reflecting surface.

While the above approach is conceptually and computationally straightforward, in reality it has a number of shortcomings. These shortcomings can result in costly operations that do not produce their intended results.

Ray tracing is very sensitive to the high spatial frequencies of the velocity model as is the case for steep, high velocity contrast boundaries. For example, in the presence of salt, small but discontinuous changes in the salt sediment interface geometry (i.e. slope) quite often result in "empty" receivers. In such cases, iterative shooting of infill rays is being used to ensure that rays are captured at an adequate number at receiver locations for each shot. However, frequently, infill ray shooting fails to converge, and as a result, a large number of receivers have no rays associated with them.

To overcome the problem of lack of "captured" rays, one is forced to smooth the model using mathematical algorithms, such as Boxcar smoothing algorithm, occasionally at unacceptable levels.

The ray tracing approach is generally limited to a single arrival per receiver, although in the presence of complicated subsurface bodies such as salt, this is not generally the case.

Using one arrival per receiver implies that reflection points for successive receivers may jump around as the corresponding rays may belong to different branches of an expanding wavefront.

Using single reflecting points as a way of producing illumination maps is in general a very poor approximation. In reality, the energy that is constructively interfering to produce a reflection event from an interface is reflected from a rather large area, the so called Fresnel zone. The Fresnel zone is, in addition to the dominant frequency, dependent upon the 3-D geometrical relationship between the impinging wavefront curvature and the local reflecting surface curvature. As a result, it is spatially highly variable and can only be poorly approximated by using boxcar smoothing techniques of the reflection point "hit" map.

"Hit" maps by themselves are of value only for those cases where the overburden effects on ray amplitudes (transmission losses, geometrical divergence) are more or less constant or very slowly varying and therefore can be ignored. In the case of subsalt illumination, "hit" maps tend to be meaningless unless these overburden effects are taken into account. Computing such effects from ray tracing is in theory feasible but in practice extremely hard to accomplish with any degree of confidence.

The compounded effect of all the factors outlined above limits the utility of the illumination analysis, as it is currently practiced, to very simple models. It is desirable to have a mathematical modeling method that improves the utility of the illumination analysis.

BRIEF SUMMARY OF THE INVENTION

The present invention employs a wave equation-raytracing hybrid method to generate an illumination image. In one embodiment of the present invention, the rays are one-way traced from surface to subsurface; the reflection points are found by using Fermat's principle; and the amplitudes are calculated by wave function.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
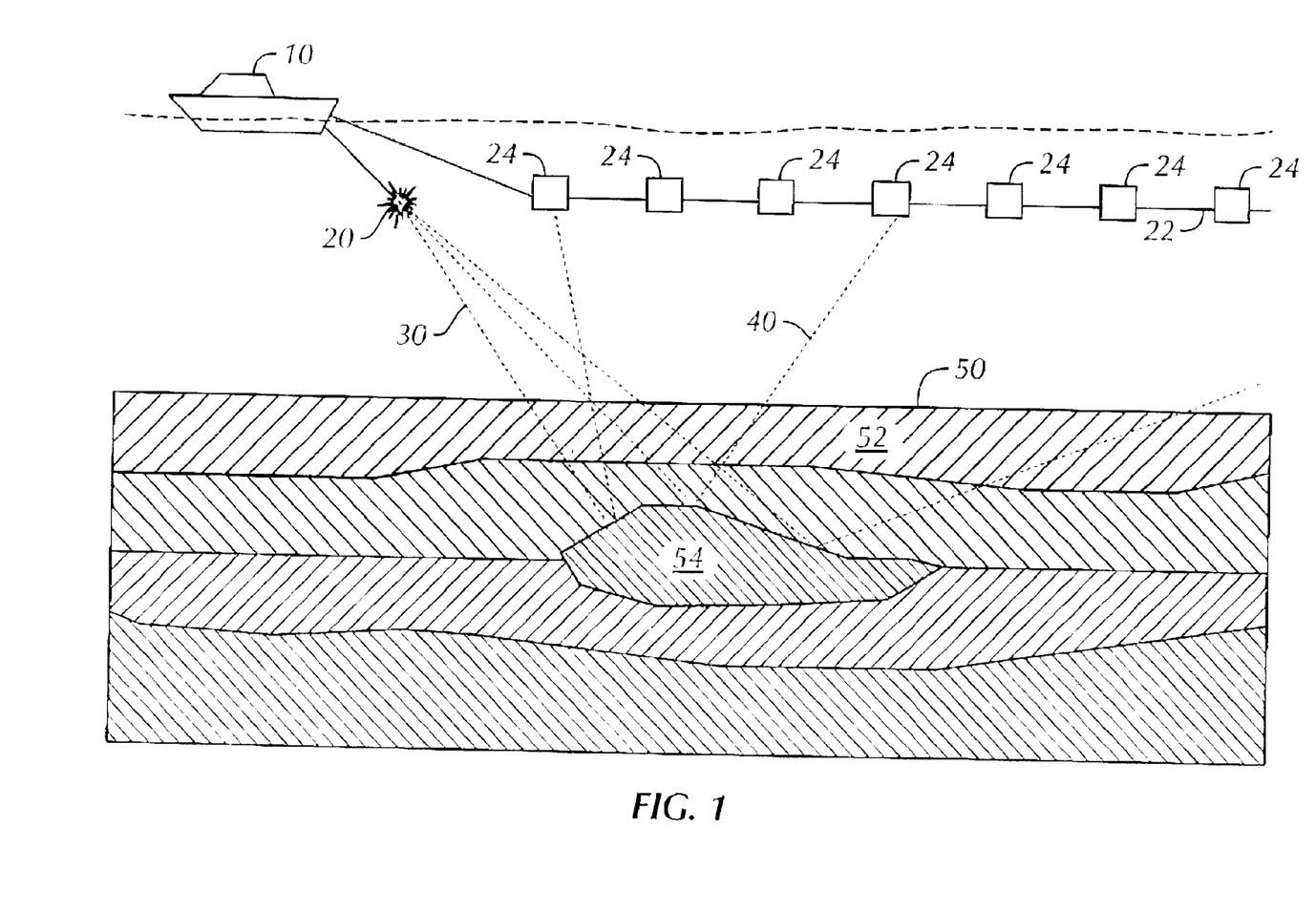
FIG. 1 depicts a general arrangement of a marine seismic survey.

FIG. 1 depicts a general arrangement for a marine seismic survey. A marine craft 10 tows a seismic source 20 and a cable 22 having a plurality of seismic sensors 24. The source 20 generates acoustic energy. Acoustic energy is generated by means of an explosion or compressed air gunshot. The downward traveling sound waves 30 hits the boundary of water and earth surface 50, traveling beyond the boundary downward through the earth formation through the earth's surface 50. The sound waves may be reflected by the earth's surface or subsurface objects 54 and travel upward towards the receivers 24. The upward wave 40 traveling to the receivers 24 will generate a plurality of electronic signals at the receivers 24. Those signals will be communicated to the vessel 10 and recorded there. The data from the source 20 and receivers 24 can then be stored in suitable storage devices associated for use with computer equipment and thereafter may be analyzed with a computer on board the marine craft 10 or sent to a remote site for further processing, analysis and study.

Figure 2:
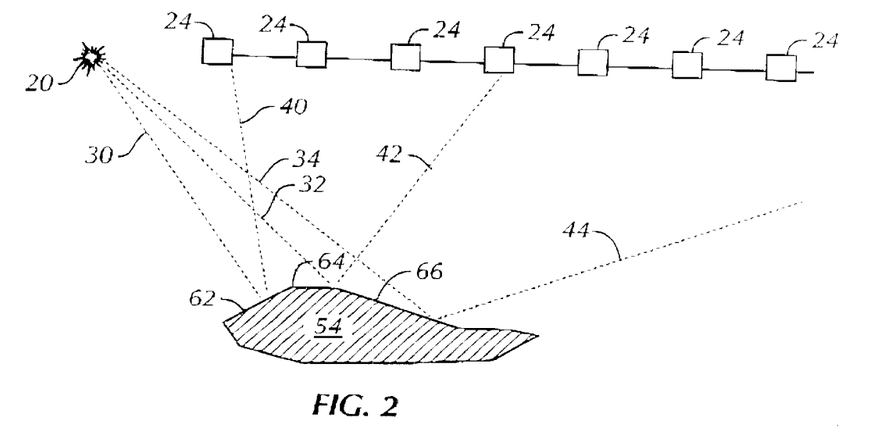
FIG. 2 depicts more details of the ray tracing and a particular earth formation.

FIG. 2 depicts more details of typical ray tracing precipitated by a subsurface object 54. The subsurface object 54 may have various surfaces with different orientation, such as 62 in the front, 64 on the top, and 66 on the back. Downward propagating sound waves 30 from source 20 may be reflected by surface 62 and become upward propagating sound waves 40 directed towards one of the receivers 24. Another bundle of sound waves 32 from source 20 may be reflected by surface 64 and becomes upward sound waves 42 directed towards a receiver 24. Due to the orientation of the surface 66, all sound waves 34 from source 20 may be reflected and become sound wave 44, which will not be received by any of the receivers 24. In a resulting illumination image, area corresponding to the surface 62 may be especially bright, due to the strong reflection, while area corresponding to surface 66 may be especially dark, since no reflected energy is detected.

Figure 3:
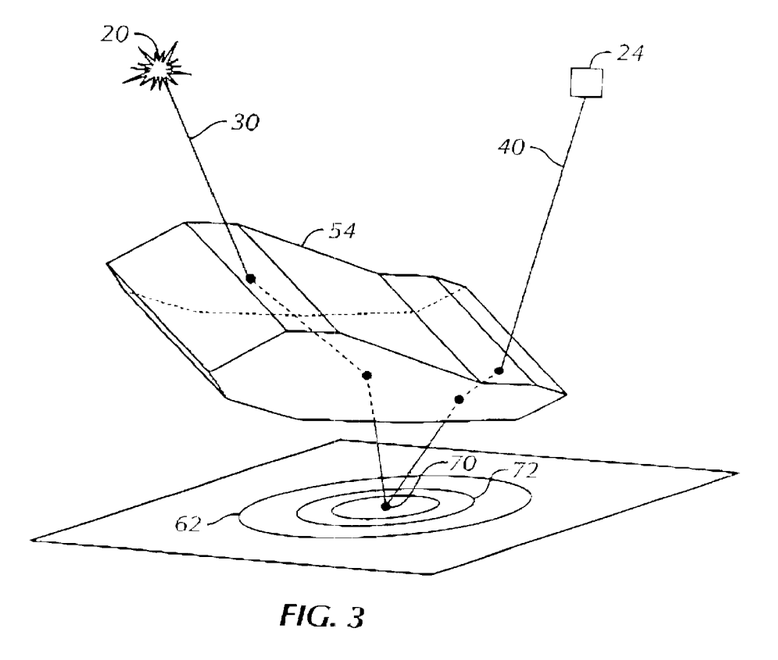
FIG. 3 depicts a Fresnel zone around a reflection point.

FIG. 3 depicts a Fresnel zone around a reflection point 70 on surface 62. For a particular combination of the source 20 and a receiver 24 there may be a point 70 on surface 62 that can reflect the sound wave 30 from the source 20 to receiver 24 as sound wave 40. In traditional ray tracing calculations for the illumination analysis, only the reflection from the reflection point 70 is considered at the receiver 24. In reality all locations around the reflection point 70 within the Fresnel zone 72 will contribute sound wave energy at the receiver 24 due to the constructive interference of the seismic waves for a given frequency. Waves with different frequencies will have Fresnel zones of different sizes.

FIGS. 4–9 depict images using prior art illumination methods and the improvements described by the present invention. The present invention facilitates the interpretation of a "dark hole" in an image to determine whether it is due to the intrinsic property of a subsurface geological formation (such as salt dome, oil reserve, hard rock) or extrinsic geometry of the formation, such as the shape of the object, the surface orientation etc.

Figure 4:
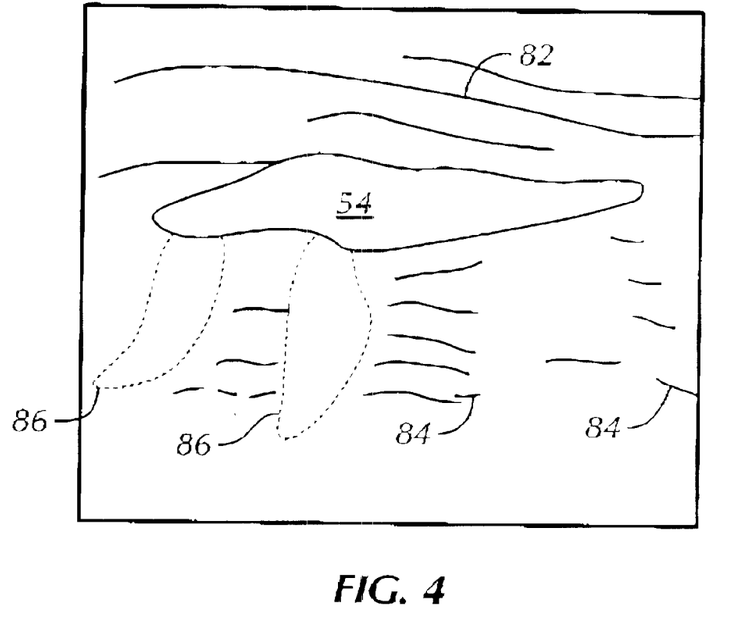
FIG. 4 depicts a typical seismic image.

FIG. 4 depicts a typical seismic image of a vertical subsurface cross-section. There are flat layers 82 above a sand dome 54. Below the sand dome, there are areas 84 look like some geophysical formation and areas 86, where the layers are not very clear and with breaks.

Figure 5:
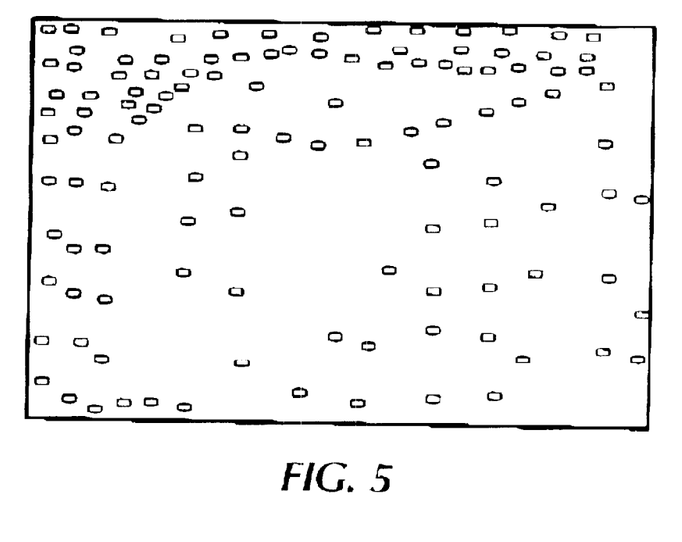
FIG. 5 depicts an illumination image of the same seismic region in FIG. 4, produced by prior art illumination analysis hit-map method

FIG. 5 is an illumination image using prior art "hit map." It is clear that above the sand dome 54, there are a lot of illuminations, or a large amount of sound energy from sources returned to the receivers. The illumination below the sand dome 54 is poor.

Figure 6:
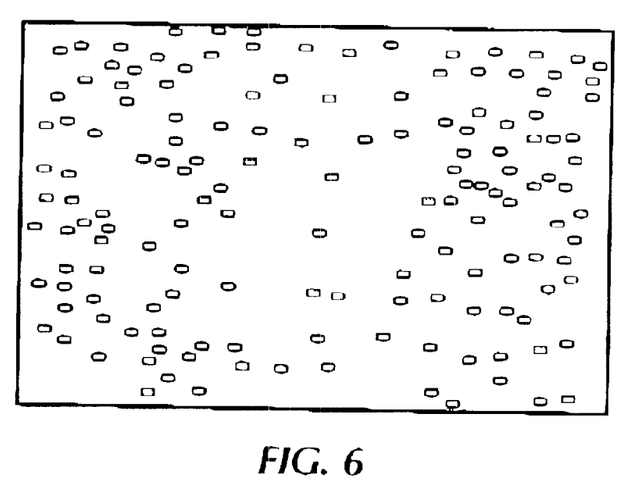
FIG. 6 depicts the same image as in FIG. 5, illustrating the improved illumination image of the subsurface region produced by one of the embodiments of the present invention, the scattered reflection method.
Figure 7:
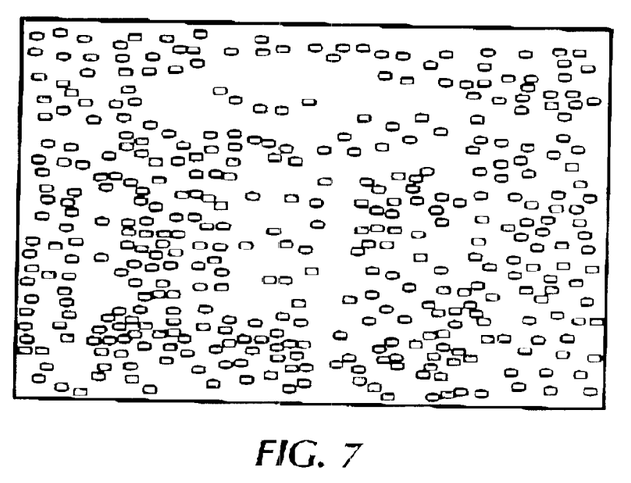
FIG. 7 depicts another improved illumination image produced using one of the embodiments of the present invention, the hybrid method.

FIGS. 6 and 7 are illumination images using two simplified of the embodiment of the current invention. It is clearer than the prior art "hit map" that there are regions below the sand dome 54 that have varied illumination intensity. The illumination differences are likely caused by the surface configuration of the sand dome 54. The regions 84 in FIG.

4 are likely due to the lack of illuminations, rather than due to particular geophysical formations.

Figure 8:
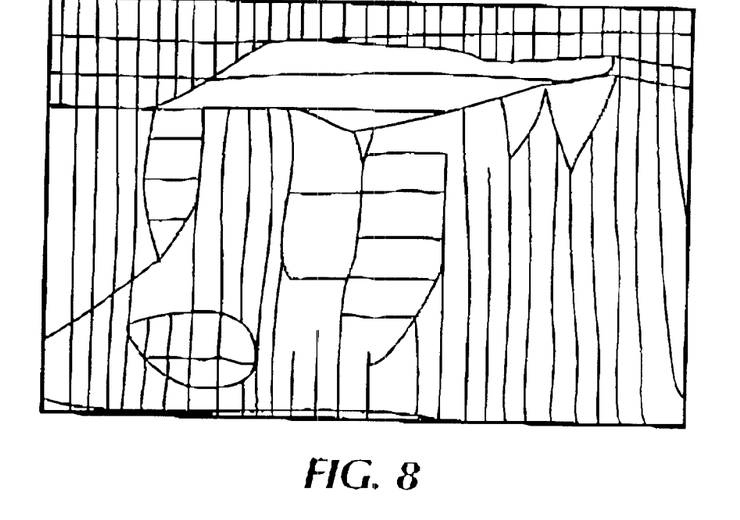
FIG. 8 depicts the same image as in FIG. 7, with Fresnel zone enhancement.

FIG. 8 is an illumination image using an embodiment of the current invention. It is clear that different regions underneath the sand dome 54 have different illumination intensity. When the blocking effect of the sand dome 54 dies out, the illumination become more uniform again.

Figure 9:
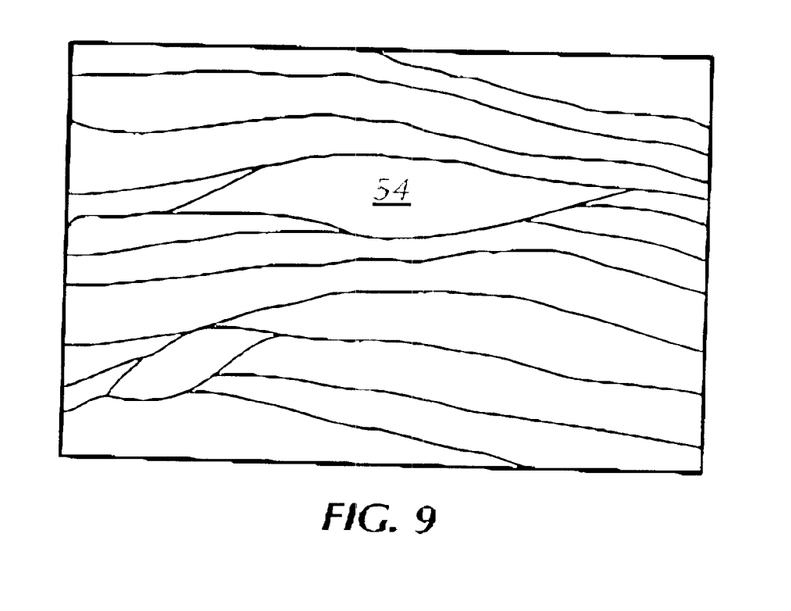
FIG. 9 depicts the same seismic image as in FIG. 4 with illumination compensation of one of the preferred embodiments.

FIG. 9 is a seismic image for the same region as the one depicted in FIG. 4. After illumination compensation, there is a lot more continuity of the subsalt events as area of weak signal have been amplified to compensate for the unevenness in illumination.

The unevenness in subsurface illumination measured using the present invention can be used to guide differential amplitude balancing of the input seismic data into the subsurface imaging process that yields the reflectivity R(r), or modify the reflectivity R(r) itself after R(r) is calculated from the imaging process, so that a better and more interpretable subsurface image is produced. This modification of reflectivity R(r) using illumination image is referred to as illumination compensation.

Applying an embodiment of the current invention, one first needs to have a 3-D subsurface model of the interested 3-D volume, e.g. the region 52 as shown in FIG. 1. Such model is a topological representation of the subsurface in which different compartments such as layers, fault blocks, salt bodies, etc. have a predefined sound propagation speed. The model can be set up using the known information from a prior seismic survey, or estimation for the region of interest. The wave function W in the region of interest can be calculated once the source location 20 and the receiver locations 24 are determined. A particular surface 62, 64 or 66 within the region 52 may be selected for more specific illumination analysis. In this embodiment, the following steps are employed:

1. The 3-D subsurface medium model is used to calculate travel times from surface shot points 20 to any point in the medium, just as is commonly done in prior art methods. One example of a prior art method in use is Primus™, a commercial implementation of Kirchhoff prestack depth migration (PreSDM) from the assignee of the present invention, GX Technology. Each travel time cube represents the time it takes for the sound to propagate directly from the source at the surface to all the points in the medium. Similarly, the travel time from a receiver on the water surface to the point in the medium can be calculated by substituting the source for the receiver. This substitution then permits one to assume that the travel time from a point in the medium to the receiver is the same as the travel time from the receiver to the same point in the medium Therefore the total travel time from the source to the receiver, through a point in the medium can be calculated, that total travel time being the sum of the travel times from the source to the point and the receiver to the point. The above method for calculating the total travel time is the ray tracing aspect of the current invention. One must bear in mind that when applying Kirchhoff imaging, there are no assumptions regarding the orientation of reflecting events and the only limits that are imposed on such orientation relate to the maximum propagation angle of the rays during ray tracing and the size of the cube (migration aperture).

2. The amplitude cubes for a grid of shots 20 at the surface are then calculated, in a manner similar to the travel time cubes used for imaging, using the same subsurface velocity model. If a commercial implementation of PreSDM applies a smoothing function to the velocity model, then it may be more beneficial to disable such smoothing function in this step. For each individual shot, the subsurface amplitude of the downward propagating wave field for all frequencies in the spectrum, typically between 5–30 Hz is computed. Thereafter a 3-D amplitude volume that is centered at the surface around that shot is created using Wave Equation Prestack Depth Migration method (WE PreSDM), for example, Optimus, a commercial implementation of WE PreSDM from the assignee of the present invention, GX Technology. The foregoing two steps should be repeated for a number of shots on a surface grid, typically 200×200 meter. Every individual cube in the medium volume is typically sampled on a 100×100×100 meter grid. The results, the amplitudes and travel times for all grid points in the medium will be used for illumination computations on a per shot basis. The amplitudes and travel times will be calculated for all combinations of all sources and receivers. These amplitudes and travel times will be utilized repeatedly in the following steps of the present invention.

3. A surface, e.g. subsurface 62, H(x,y) over which illumination analysis is to be performed is defined. Also defined is the acquisition geometry, i.e. the exact location of the sources and receivers of the actual field seismic experiment, or an idealized shooting geometry. For an individual trace with source coordinates S(x,y) and receiver coordinates G(x,y), its illumination contribution to surface H(x,y) can be calculated as follows:

a) The ray tracing surface travel time cubes pre-computed by PreSDM, as in Step 1, is interpolated to derive the travel times from the exact surface location of the source S(x1,y1) and the receiver G(x2,y2) to cubes of subsurface points Vs(x,y,z) and Vg(x,y,z) respectively. The (x,y,z) variables in these cubes are discretized on the same grid but they are typically sampled over different areas.

b) The resulting cubes Vs(x,y,z) and Vg(x,y,z) are summed over their area of overlap to compute the two-way travel times from the source S(x1,y1) to the subsurface Vsg(x3,y3,z3) and back to the receiver G(x2,y2).

c) Determine the intersection point between the resulting travel time cube Vsg(x3,y3,z3) and the surface H(x,y) to extract the summed travel times along that surface, i.e. for each and every point on the surface H(x,y), calculate the total travel time from the source S(x1,y1) to the subsurface point H(x,y) and back to the receiver G(x2,y2).

d) Locate the global and local minima of travel times along that surface. These travel times will correspond to one or more reflection points off the H(x,y) surface for a source at S(x1,y1) and a receiver at G(x2,y2) as dictated by Fermat's principle, which essentially provides that the reflection point on a surface is a point where the travel time is the minimum. Although Snell's law and the Fermat's principle are equivalent with respect to reflection, using Fermat's principle to locate the reflection points is much easier to implement using computer simulation techniques. Thus the non-convergence issues associated with ray tracing based on Snell's law can be avoided.

e) Compute the area around the minima over which the travel times increase by a quarter of the dominant period. These areas specify the Fresnel zones for each reflection event. All rays reflected by the points within a Fresnel zone will contribute to the signal at the receiver. While each frequency has a different Fresnel zone that should be considered separately, using a single Fresnel zone that corresponds to the dominant frequency in the data has proven to be an acceptable compromise for many types of geological formations.

f) Interpolate the pre-computed wave amplitudes by wave equation PreSDM to derive the amplitudes of the wave from the exact surface location of the source S(x1,y1) and the receiver G(x2,y2) to cubes of subsurface points Vs(x,y,z) and Vg(x,y,z) respectively. This is exactly analogous to substep a) above.

g) Multiply the resulting amplitude cubes Vs(x,y,z) and Vg(x,y,z) over their area of overlap to compute the full overburden effects of propagation from the source S(x1,y1) to the subsurface Vsg(x3,y3,z3) and back to the receiver G(x2,y2).

h) Determine the intersection point between the resulting amplitude cube Vsg(x3,y3,z3) and the surface H(x,y) and extract the composite amplitude along that interested surface.

i) Zero out all amplitudes outside the Fresnel zones that were defined in step e), since they do not contribute to any reflection events off of the surface H(x,y) for a source at S(x1,y1) and a receiver at G(x2,y2).

j) Repeat the calculation for waves with different frequencies, from the same source S(x1,y1) and receiver G(x2,y2) reflected on surface H(x,y). Thereafter the amplitude for all waves frequencies on the surface H(x,y) due to the source S(x1,y1) and receiver G(x2,y2) are summed. To gain more detail the Fresnel zone for each frequency needs to be computed separately.

From the foregoing steps, the illumination within a Fresnel zone on the surface H(x,y), corresponding to one source at S(x1,y1) and one receiver G(x2,y2) is determined.

4. Sum the illumination contributions from all individual traces to compute the illumination map for the surface H(x,y), including all the sources and all the receivers.

Thus, the illumination over the entire zone of interest is obtained. If any additional zones of interest within the 3D volume 52 are desired, the process can be repeated with minimal computation. As may be appreciated by one of ordinary skill in the art, the calculation steps for obtaining the illumination map from a single trace, outlined in step 3 above, are listed in a particular order only for reasons of clarity. As can be further appreciated by one of ordinary skill in the art, the order and combination of the steps outlined above can be varied and modified to maximize the computational efficiency.

In another embodiment of the present invention good results can be obtained with less computational intensity, by carrying out only the substeps i), g), and h) described in the above embodiment of the present invention in step 3 above In this embodiment, we assume that the frequency of the propagating wavefield is zero, therefore the Fresnel zone extends to infinity. In this embodiment, the resulting illumination may have lower resolution and less accuracy than that described the first embodiment.

A third embodiment of the present invention can be obtained by using only the substeps f), g) described in the first embodiment of the present invention in step 3 above. The resulting illumination for each point in the volume can be described in the context of a scattering point rather than a reflecting surface. That is, the illumination obtained does not provide information regarding the direction from which the point was illuminated. The illumination direction is very important when the point is viewed in the context of a surface going through which may have arbitrary dip orientation and magnitude. Even this initial estimate of the overburden F(r) is still much better than the prior art "hit map." The last two embodiments of the rpesent invention are essentially the same. The only difference is that in the third embodiment, all points in a 3-D volume are analyzed while in the second embodiment only points on a surface within the 3-D volume are analyzed. In neither embodiment, the directional information is obtained.

As illustrated above, various steps can be omitted to get a satisfactory result at a lower computational cost. The more steps employed, the better quality of the illumination images, but at a higher cost.

The hybrid method of the present invention describe herein provides a technique and method of advantageously using ray tracing in only one direction, i.e. from a source and a receiver to a reflecting surface on a seismic object. In this manner, the problems associated with no ray convergence to particular receivers as well as the problems associated with no ray convergence due to associated non-geology related illumination holes can be avoid.

Another advantage of the present invention is that rays used in one-way ray tracing are the same as in depth migration, so there is consistency between Kirchhoff depth migration and illumination analysis. Additionally, the reflection points are found by using Fermat's principle rather than Snell's law thereby resulting in a simpler (and faster) computational analysis. The present invention allows for computation of both multiple arrivals and all points located within the Fresnel zone. Amplitudes can be readily calculated by using the wave equation.

In some prior art illumination analysis, the illumination analysis is based on transmitted rather than reflected energy. The former has been promoted recently ("Practical, accurate, full-azimuth 3-D prestack finite difference depth migration," by Z. Zhou et al., SEG/San Antonio 2001 Expanded Abstracts) as a wave equation alternative to ray based methods. Transmitted energy based illumination methods use the combined subsurface amplitude strength of the downgoing wavefield from all sources but ignore the receiver distribution for each source. For proper illumination analysis it is essential that one computes the magnitude of the energy from the source that reaches the target in the subsurface and the magnitude of the energy that returns to the surface and is recorded by the receivers.

In the present invention, both the source and the receiver wavefields are utilized. From a computational point of view, once the basic elements outlined in steps 1 and 2 above have been computed, subsurface illumination for any arbitrary horizon can be carried out with little additional cost.

Illumination maps obtained with the present inventions for surfaces of interest within a seismic medium have many uses. Exemplary of those uses are: a) A useful tool to decide whether an identified drillable target is correctly characterized as hydrocarbon bearing or whether such characterization is false and purely the result of uneven illumination; b) A useful tool to decide whether the poor image quality observed in the seismic data in a particular region is the result of poor subsurface illumination and therefore whether a new seismic survey is needed; c) A useful tool to determine the optimal way to acquire new seismic data to best illuminate the particular target; d) To the extent that the illumination analysis is done in real time, the present invention can be a useful guide to field personnel during new seismic acquisition for infill shooting to improve the illumination of the target; e) As a precursor to determine whether expensive Prestack Depth Migration effort can be used to improve the seismic image quality; and f) as a useful tool to identify seismic events observed in seismic images in poorly illuminated that heretofore have been identified as a signal of interest rather than merely a false return (e.g. noise)

The present invention can be used to generate illumination maps or illumination volumes to compensate seismic images, or attribute maps derived from seismic images, where appropriate compensation was not performed during seismic imaging. The foregoing compensation can be achieved in a number of ways, including: a) a subsurface horizon amplitude map that attempts to depict the strength of the reflectivity function R(r) can be normalized by the corresponding illumination map F(r); b) the same as described in a) can be accomplished in a volume sense. In this case, the illumination volume is derived by ignoring the ray tracing and Fresnel zone computations of the current invention, i.e. by assuming that the subsurface consists of a series of scattering points rather than reflecting surfaces.

Illumination volumes of traces from individual shots (or any other ensemble of traces) can also be used to compensate the seismic image during the imaging procedure itself This is accomplished by using the present invention to normalize the seismic volume produced from each individual shot gathered by the corresponding illumination volume prior to summation of the seismic volumes from all shots to construct the final composite image.

The illustrative embodiments described above are directed primarily to marine seismic surveys, but they are equally applicable to any seismic surveys, such as land seismic surveys.

While illustrative embodiments of the invention have been provided and described, it will be appreciated that various changes can be made therein without departing from the spirit and scope of the invention.

We claim:

1. A method for obtaining an improved seismic illumination image of a zone of interest, the method comprising steps of:
   a) having a model of the zone of interest, wherein the zone of interest is divided into plurality of cubes;
   b) having one or more seismic sources;
   c) having one or more seismic receivers;
   d) selecting a frequency of interest from a spectrum of frequencies;
   e) computing a wave function amplitude in a cube associated with a seismic source;
   f) computing a wave function amplitude in the cube associated with a seismic receiver;
   g) calculating the illumination in the cube associated with the source and the receiver by multiplying the source amplitude to the receiver amplitude;
   h) repeating the calculation of illumination in the cube for all frequencies in the spectrum; and
   i) summing the illumination in the cube associated with all frequencies in the spectrum;
   j) summing the illumination in the cube associated with all sources and receivers;
   k) repeating the illumination calculation for each cube in the seismic medium to obtain the illumination image of the zone of interest.

2. A method for obtaining an improved seismic illumination image of a zone of interest, the method comprising steps of:
   a) having a model of the zone of interest containing a seismic surface, wherein the medium is divided into cubes;
   b) having one or more sources;
   c) having one or more receivers;
   d) determining reflecting points on the seismic surface where a wave with a frequency from a source is reflected to a receiver;
   e) calculating illumination at the reflection points on the seismic surface for one selected frequency from the source and the receiver;
   repeating step d) and e) above for all frequencies;
   f) summing all of the illuminations for all frequencies and for all source and receiver pairs at all points on the surface.

3. The method in claim 2, wherein the step of
   d) finding all reflecting points on the surface where a wave with a frequency from a source is reflected to a receiver, comprising steps of:
      a) having a ray tracing function for the frequency for calculating the travel time from one point to another within the medium,
      b) calculating the travel time from the source to a cube on the seismic surface and the travel time from the receiver to the cube using the ray tracing function;
      c) adding the travel time of the subsurface source and receiver cubes in their area of overlap to determine the travel time from the source to the point in the cube and back to the receiver;
      d) extracting the travel time at the intersection of the cube with the reflecting surface;
      e) determining the minima of the total travel times, where the cubes have minima total travel time contain the reflecting points on the surface where a wave with the frequency from the source is reflected to the receiver.

4. The method in claim 2, wherein the step of
   e) calculating illumination at the reflection points on the seismic surface for one selected frequency from the source and the receiver, comprising steps of:
      a) having a solution to the wave equation to compute the wave function from one point to another within the medium for any particular frequency;
      b) calculating the wave function amplitude from the source to a subsurface cube;
      c) calculating the wave function amplitude from the receiver to the subsurface cube;
      d) calculating the illumination in the area of overlap between the source and the receiver cubes by multiplying the source amplitude and the receiver amplitude;
      e) extracting the amplitudes at the intersection of the cube with the reflecting surface;
      f) repeating steps a) through d) for all reflection points.

5. The method in claim 2, further comprising steps of:
   a) determining an associated Fresnel zone with a determined reflecting point corresponding to a set of source and a receiver;
   b) calculating illumination at all points within the Fresnel zone at the reflection point on the seismic surface for one selected frequency from the source and the receiver.

6. The method in claim 5, wherein the step of
   a) determining an associated Fresnel zone with a determined reflecting point, comprising steps of
      a) determining the boundary around the reflection point, wherein the total travel time for a wave with one selected frequency from the source to the receiver passing by a point on the boundary equals to the total travel time from the source to the receiver passing by the reflection point plus one quarter of the time period of the wave;
   b) calculating the illumination at all cubes within the boundary due to the source and the receiver.

7. A method for improving a seismic image with illumination compensation, the method comprising steps of:
   a) having a seismic image;
   b) having a seismic model for the seismic medium;
   c) obtaining an illumination image for the seismic medium;
   d) normalizing the seismic image with the illumination image.

8. The method in claim 7, wherein
step c) obtaining an illumination image from the seismic medium, comprising steps of:
   a) selecting a surface in the medium;
   b) having sources and receivers;
   c) determining all reflecting points on the surface where a wave with one selected frequency from a source is reflected to a receiver;
   d) calculating illumination at the reflection points on the seismic surface for the frequency from the source and the receiver;
   e) repeating step c) for all frequencies;
   f) for each and all points on the surface, summing all illuminations at the points as calculated above;
   g) repeating for all surfaces in the medium.

9. The method in claim 8, wherein
step c) determining all reflecting points on the surface where a wave with one selected frequency from a source is reflected to a receiver, comprising steps of:
   a) having a ray tracing function for the frequency for calculating the travel time from one point to another within the medium;
   b) calculating the travel time from the source to a cube on the seismic surface and the travel time from the receiver to the cube using the ray tracing function;
   c) adding the travel time from the source to the cube and the travel time from the receiver to the cube, to get the total travel time, which is the travel time from the source to the receiver passing by the cube on the surface;
   d) calculating the total travel time for all cubes on the surface;
   e) determining the minima of the total travel times, where the cubes have minima total travel time contain the reflecting points on the surface where a wave with the frequency from the source is reflected to the receiver.

10. A computer-readable medium having a computer-executable program therein for performing the method recited in any one of claims 1–9.

11. A computer system having a processor, a memory, and an operating system, wherein the computer system is operable to perform the method cited in any one of claims 1–9.

* * * * *